(12) United States Patent
Dehlsen et al.

(10) Patent No.: US 10,982,654 B1
(45) Date of Patent: Apr. 20, 2021

(54) YAWING BUOY MAST FOR FLOATING OFFSHORE WIND TURBINES

(71) Applicant: Dehlsen Associates, LLC, Santa Barbara, CA (US)

(72) Inventors: James G. P. Dehlsen, Santa Barbara, CA (US); Peter Stricker, Santa Barbara, CA (US)

(73) Assignee: DEHLSEN ASSOCIATES, LLC, Santa Barbara, CA (US)

( * ) Notice: Subject to any disclaimer, the term of this patent is extended or adjusted under 35 U.S.C. 154(b) by 0 days.

(21) Appl. No.: 16/659,542

(22) Filed: Oct. 21, 2019

Related U.S. Application Data (60) Provisional application No. 62/881,767, filed on Aug. 1, 2019.

(51) Int. Cl.
| | |
|---|---|
| *F03D 13/25* | (2016.01) |
| *F03D 7/02* | (2006.01) |
| *B63B 35/44* | (2006.01) |

(52) U.S. Cl.
CPC .............. *F03D 13/25* (2016.05); *B63B 35/44* (2013.01); *F03D 7/0204* (2013.01); *B63B 2035/442* (2013.01); *B63B 2035/446* (2013.01)

(58) Field of Classification Search
CPC .. B63B 1/00; B63B 1/22; B63B 21/00; B63B 21/50; B63B 21/502; B63B 35/00; B63B 35/44; B63B 2035/442; B63B 2035/446; B63B 1/107; F03D 13/00; F03D 13/25; F03D 7/00; F03D 7/02; F03D 7/04; F03D 9/00; F03D 11/00; F03D 11/04; F03D 7/0204

USPC ............... 114/264, 266, 265; 290/44, 55; 405/223.1

See application file for complete search history.

(56) References Cited

U.S. PATENT DOCUMENTS

| | | | |
|---|---|---|---|
| 2006/0144311 A1* | 7/2006 | Heyring | B63B 1/22 114/284 |
| 2011/0074155 A1* | 3/2011 | Scholte-Wassink | B63B 35/44 405/224 |
| 2019/0078556 A1* | 3/2019 | Stiesdal | B63B 21/502 |

OTHER PUBLICATIONS

Notification of Transmittal of the International Search Report and the Written Opinion of the International Searching Authority, or the Declaration; International Search Report and Written Opinion of the International Searching Authority for related International Application No. PCT/US2020/044741, dated Sep. 14, 2020, 6 pages.

\* cited by examiner

*Primary Examiner* — Lars A Olson
(74) *Attorney, Agent, or Firm* — Insigne PC (57) ABSTRACT

The present invention provides a novel, floating, offshore wind turbine (FOWT) structure, referred to as a yawing buoy mast (YBM) structure. The YBM platform vertically combines a submerged spar buoy with outrigger legs and a mast on which a wind turbine nacelle is mounted. Compared to a conventional spar buoy wind turbine, weight is significantly reduced by optimizing how loads are borne and reacted by the floating structure. The mass of the YBM platform is reduced relative to the energy captured by the turbine resulting in a reduction in the cost of energy (COE). Platform load dynamics are coupled with the dynamics of the wind turbine by integration of the YBM platform and turbine controllers.

18 Claims, 7 Drawing Sheets

Fig 1

*(Prior Art)*

YAWING BUOY MAST FOR FLOATING OFFSHORE WIND TURBINES

CROSS-REFERENCE TO RELATED APPLICATION

The present application claims priority to U.S. Provisional Patent Application No. 62/881,767, filed Aug. 1, 2019, entitled "Yawing Buoy Mast for Floating Offshore Wind Turbines," the disclosure of which is incorporated by reference in its entirety.

BACKGROUND OF THE INVENTION

1. Field of Invention

This invention relates to floating support structures for offshore wind turbines.

2. Description of Related Art

Figure 1:
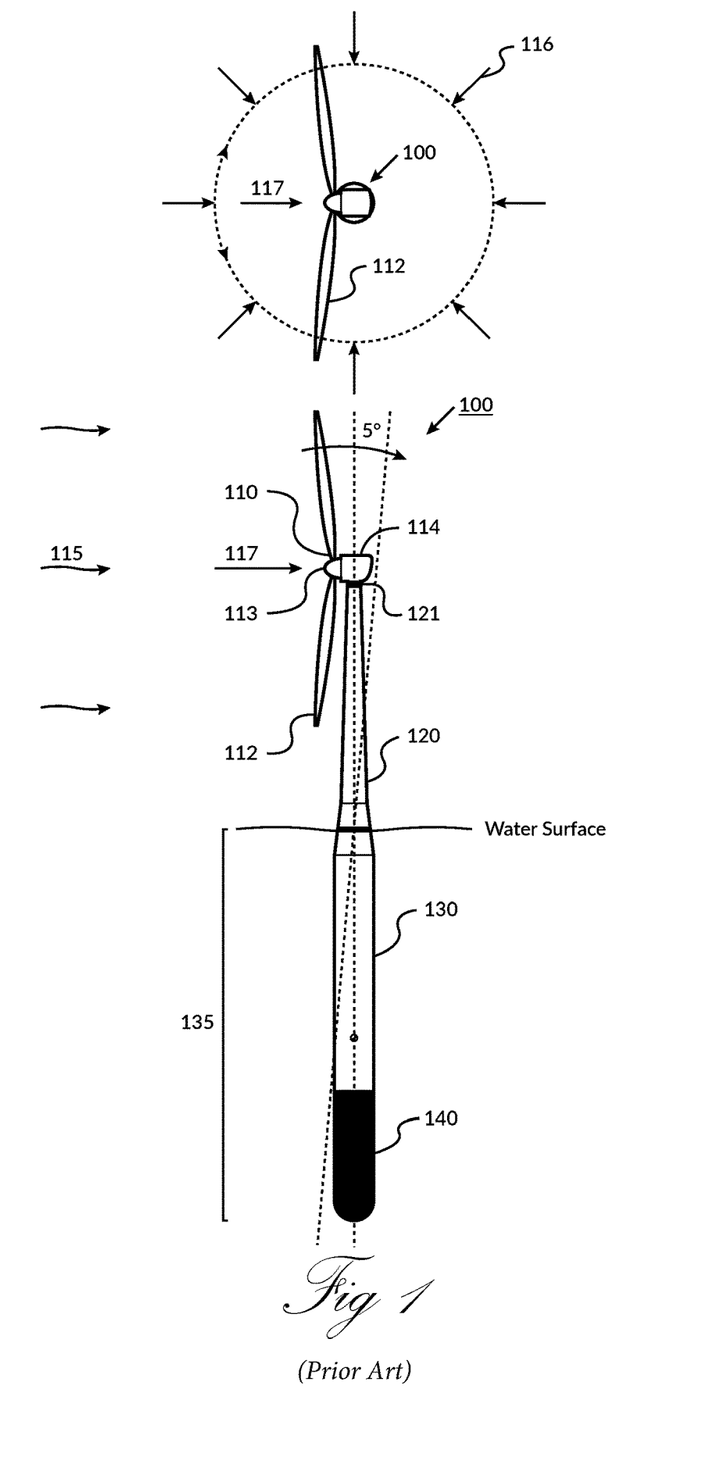
FIG. 1 illustrates top and side views of a conventional spar buoy FOWT.

Wind turbines and towers ranging in capacity from 5 to 15 MW are well advanced and generally have limited modifications for offshore deployment. In shallow water (i.e., less than 50 m), turbine towers may be mounted on a structure fixed to the seabed. In deep water, turbine towers (masts) may be mounted on a floating wind turbine platform (turbine, mast and platform known as a "floating offshore wind turbine" or "FOWT"). Referring to FIG. 1, one type of FOWT is a spar buoy 100, which is a well-characterized marine vessel suited for deep-water deployment. Generally, the spar buoy FOWT 100 comprises a wind turbine generator ("WTG") 110, a mast 120, a main buoyancy section 130, and a ballast section 140. Together the main buoyancy section 130 and ballast section 140 comprise the spar buoy 135. The spar buoy 135 comprises a cylindrical vessel that is anchored to the sea floor via one or more mooring lines (not shown). The WTG 110 comprises a number of (typically, two or three) rotor blades 112 affixed to a hub 113, and main shaft, gear box, generator and yaw system, all within a nacelle 114, the implementation of all of which are apparent to one of ordinary skill in the art. The cost of this type of platform is burdened by the spar buoy 135, which is required to be massive and long to ensure stability in sea states that impose heave, surge, and pitching loads, and required to ensure stability in high wind conditions.

The spar buoy 135 provides vertical stability (overturning resistance) by having sufficient buoyancy at the high end of the spar and the mass concentrated at the lower end of the spar with enough separation between both to provide the required gravitational overturning resistance, to the wind thrust 117 on the WTG 110 resulting from wind loading 115 of the rotor plane. The spar buoy FOWT 100 requires vertical stability of the WTG 110 and mast 120 in facing wind thrust loads on the turbine rotor through 360 degrees of potential wind directions 116. To maintain stability under these wind conditions, present FOWT designs have very large buoyancy capacity, ballast capacity and spar length as necessary to provide platform axis-symmetric wind thrust resistance.

Typically, the WTG 110 autonomously faces into the wind through activation of an electromechanical yaw system 121 existing between the nacelle 114 and mast 120 top that rotates the WTG 110 horizontally on a large bearing coupled to the mast 120. The yaw system 121 is comprised of a ring gear mounted on a ring bearing, with multiple yaw motor drives and brakes, the implementation of all of which are apparent to one of ordinary skill in the art, and which accounts for a portion of the tower head mass ("THM"). THM mass comes at a high cost, since the mass of the yaw system at the top of the mast must be directly offset by buoyancy in the spar buoy 135 and secondarily with proportional overturning resistance, which requires flotation spar volume 130 and structure and ballast 140. Added ballast requires more structure for compensating buoyancy. The added THM of the yaw system requires longer spar length and/or more ballast to produce enough gravitational restoring moment between the center of buoyancy and the center of mass to counter the tipping moment induced by the yaw system mass.

SUMMARY OF THE INVENTION

The present invention overcomes the need for extensive flotation and spar mass, and other deficiencies of the prior art by providing a novel floating structure for a FOWT. The present invention FOWT is a yawing buoy mast ("YBM") platform that combines a vertical, submerged, cylindrical spar buoy with horizontal outrigger legs, and a vertical mast on which a wind turbine nacelle is mounted. Compared to a conventional spar buoy wind turbine, weight is significantly reduced by optimizing how loads are borne and reacted by the floating structure. The reduced weight of the YBM platform equates to reduced cost without reducing the energy captured by the turbine, resulting in a reduction in the cost of energy ("COE"). Wind, wave and current loads (i.e., sea state loads) act on the spar buoy, outrigger legs and mast producing dynamic motion (dynamics), which are inherently coupled with the dynamics of the wind turbine. The combined dynamic behaviors of the spar buoy, outrigger legs, mast and wind turbine are managed and controlled by the coordinated functions of a YBM platform control system and turbine control system.

In an embodiment of the invention, a floating offshore wind turbine comprises: a spar buoy; a wind turbine and mast affixed to the spar buoy; a first outrigger leg coupled to the spar buoy via a first hinge; a second outrigger leg coupled to the spar buoy via a second hinge; and a first marine thruster. The floating offshore wind turbine may further comprise a first float attached to the first outrigger leg and a second float attached to the second outrigger leg. The first marine thruster is coupled to the first outrigger leg via the first float. The floating offshore wind turbine may further comprise a second marine thruster, wherein the second marine thruster is coupled to the second outrigger leg via the second float. The first hinge permits a distal end of the first outrigger leg to move relative to a central axis of the spar buoy. The floating offshore wind turbine may further comprise a first actuator affixed between the first outrigger leg and the spar buoy, and the first actuator configured to move the distal end of the first outrigger leg relative to the central axis of the spar buoy. The second hinge permits a distal end of the second outrigger leg to move relative to the central axis of the spar buoy, and the floating offshore wind turbine may further comprise a second actuator affixed between the second outrigger leg, and the second actuator is configured to move the distal end of the second outrigger leg relative to the central axis of the spar buoy. The first marine thruster is configured to yaw the spar buoy. The second marine thruster is also configured to yaw the spar buoy. A wet-bearing slip collar encircling the spar buoy may also be included.

In another embodiment of the invention, a floating offshore wind turbine comprises: a spar buoy; a wind turbine and mast affixed to the spar buoy; an outrigger leg or fixed boom coupled to the spar buoy; a float coupled to the outrigger leg or the fixed boom; and a thruster coupled to the float to yaw the spar buoy. The floating offshore wind turbine may further comprise means for folding or unfolding the float relative to the spar buoy.

In yet another embodiment of the invention, a method of deploying a floating offshore wind turbine comprises the steps of: towing a floating offshore wind turbine comprising a spar buoy mast, a wind turbine affixed to the spar buoy mast, a first outrigger leg coupled to the spar buoy via a first hinge, and a second outrigger leg coupled to the spar buoy via a second hinge, wherein the first outrigger leg and the second outrigger leg are arranged in a folded position; unfolding the first outrigger leg and second outrigger leg away from the folded position to an unfolded position via the first hinge and the second hinge; and mooring the floating offshore wind turbine to a seabed. The method may further comprise the step of installing wind turbine blades onto the wind turbine while the first outrigger leg and the second outrigger leg are arranged in the folded position. The method may further comprise the step of yawing the spar buoy mast to arrange the wind turbine facing wind.

In yet another embodiment of the invention, a floating offshore wind turbine control system for a floating offshore wind turbine comprising a turbine, a platform, an outrigger leg, an actuator, a spar buoy, a thruster, and a mast, comprises: a platform controller; a sensor measuring angular position of a first outrigger leg; a sensor measuring force in the first actuator; a sensor measuring azimuth angular position of the spar buoy; and a sensor measuring tilt angle of the mast. The sensor measuring angular position of the first outrigger leg and the sensor measuring force in the first actuator send a signal to the platform controller, triggering the platform controller to issue a command to the first actuator to change position of a distal end of the first outrigger leg or to change force in the first actuator. The sensor measuring azimuth angular position of the spar buoy sends a signal to the platform controller, triggering the platform controller to issue a command to the thruster to yaw the spar buoy. The sensor measuring tilt angle of the mast sends a signal to the platform controller, triggering the platform controller to issue a command to the actuator to move the outrigger.

The foregoing, and other features and advantages of the invention will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 2b illustrates a front view of the yawing buoy mast structure of FIG. 2a;

DETAILED DESCRIPTION OF PREFERRED EMBODIMENTS

Preferred embodiments of the present invention and their advantages may be understood by referring to FIGS. 2-6, wherein like reference numerals refer to like elements. The present invention may be deployed in any type of water environment where wind is present and connection to an electrical grid is made by power cables.

The present invention provides a novel FOWT structure, referred to herein as a yawing buoy mast ("YBM") platform. The YBM platform combines horizontal outrigger legs with a vertically oriented, submerged spar buoy and vertical mast on which a WTG is mounted. Compared to the conventional spar buoy FOWT 100, the YBM platform 200 significantly reduces weight by optimizing how loads are borne and reacted by the floating structure. As a result of significant mass reduction, the cost of YBM platform is diminished without reducing the energy captured by the WTG.

Figure 2A:
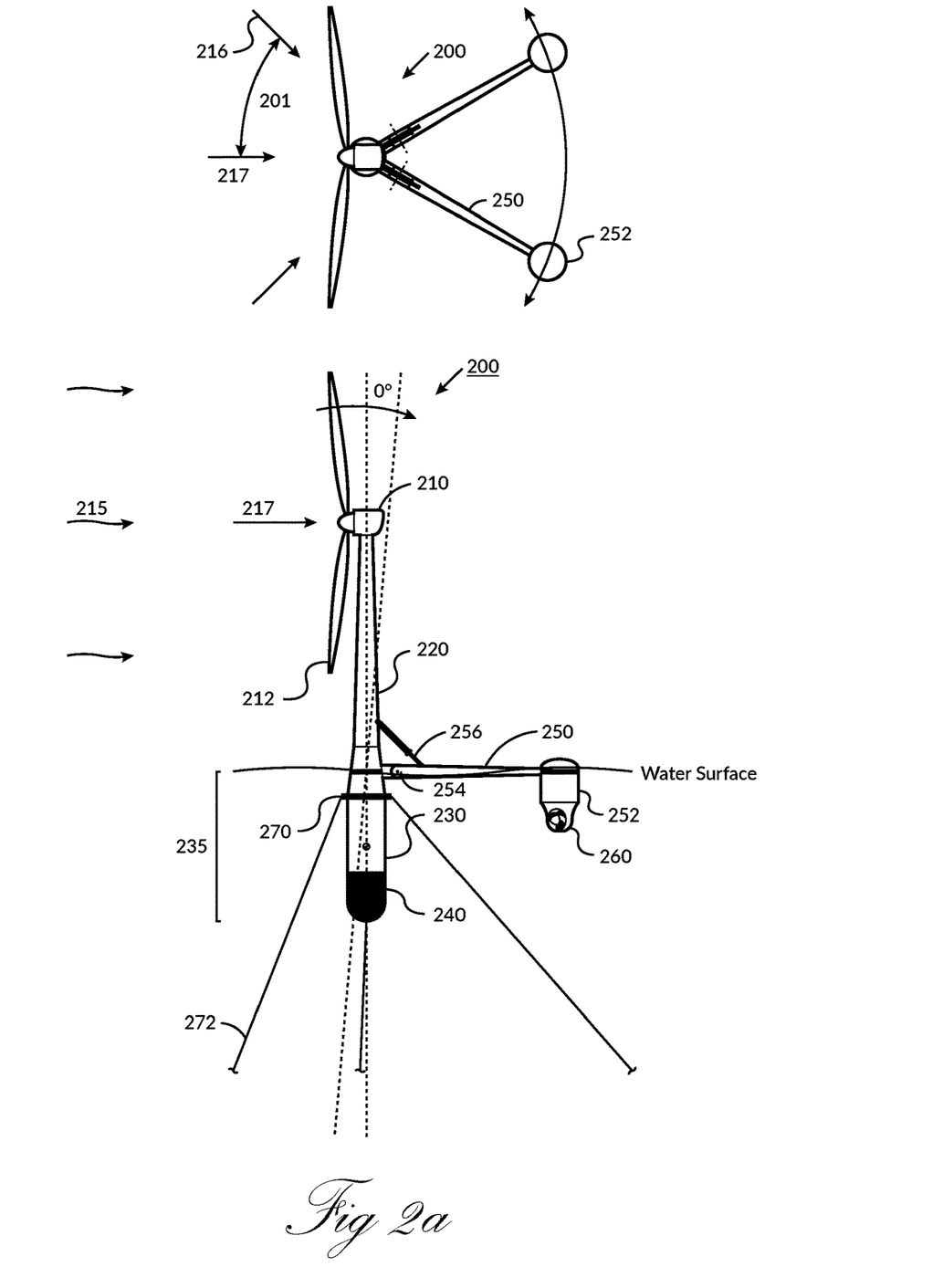
FIG. 2a illustrates top and side views of a yawing buoy mast structure according to an embodiment of the invention.

FIG. 2a illustrates a YBM platform 200 according to an embodiment of the invention. The YBM platform 200 comprises a WTG 210 with rotor blades 212, a mast 220, a spar buoy 235 comprised of a main buoyancy section 230 and ballast section 240, a slip collar 270, mooring lines 272 and one or more outrigger legs 250, preferably two, coupled to the spar buoy 235 and mast 220. One or more float(s) 252, preferably one, is attached to a distal end of each outrigger leg 250, which together provide a downwind, outboard buoyancy moment force for resisting the masthead overturning moment induced by wind thrust 217 on the WTG 210. Disposed on one or more of the floats 252 is a marine thruster(s) 260. The mast 220 is rigidly attached to the spar buoy 235 to form the central structure through which loads on the WTG 210 are conveyed to the outrigger 250, slip collar 270, and mooring lines 272. The marine thruster(s) 260, the identification and implementation of which are apparent to one of ordinary skill in the art, are mounted on the floats 252 and aligned to provide thrust in a direction tangential to the arc of the outrigger 250 about the vertical centroid of the spar buoy 235, which provide tangential force to yaw the entire YBM platform 200 to face the wind direction or another direction. The horizontal translation of the spar buoy 235 is restricted by the slip collar 270 and mooring lines 272, which only allow rotational movement.

Referring to the top views of FIGS. 1-2a, the primary rotor thrust 117 experienced by a conventional FOWT structure 100 may occur over a 360-degree range of radial directions 116, which are aligned by the yaw system 121 as wind direction changes; the present invention eliminates the tower-top yawing capability and fixes the rotor thrust direction 217 relative to the spar buoy 235 and outrigger 250 to a single direction. Limiting the rotor thrust to a single direction through the mast 220 allows for the structural requirements and materials of the mast 220 to be reduced relative to the conventional FOWT mast 120 by optimizing the mast design to carry rotor thrust loads primarily in a single plane rather than throughout a 360-degree range.

Figure 2B:
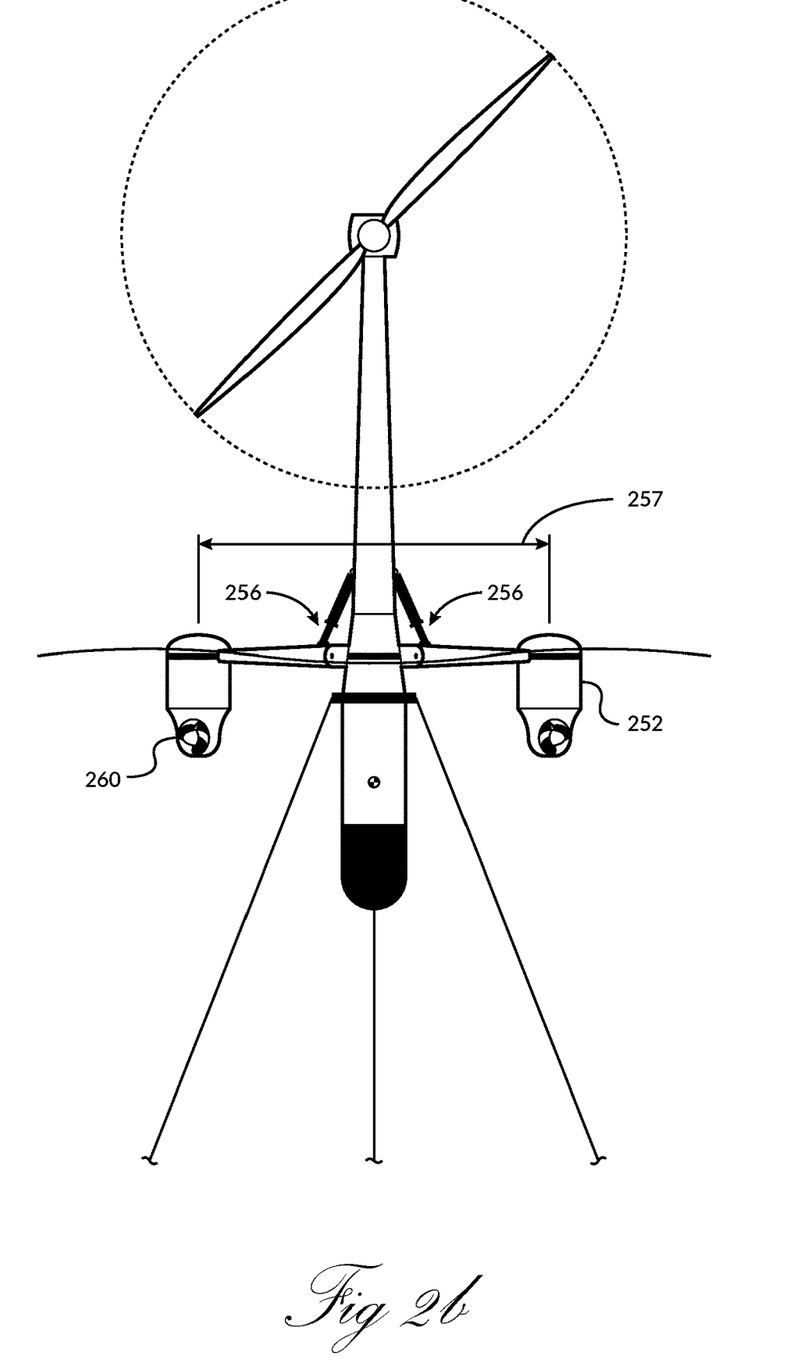

The YBM platform 200 maintains alignment of the primary rotor thrust direction 217 with the wind direction 216 by yawing the entire YBM platform 200. The angular difference between the wind direction 216 and the primary rotor thrust direction 217 is the azimuth error 201. The yaw thrusters 260 are activated when necessary to point the rotor plane normal to the wind direction and reduce the wind azimuth error 201 to zero degrees. Referring to FIG. 2b, the horizontal displacement 257 of the floats 252 from each other allows for misalignment between the wind direction 216 and the primary rotor thrust direction 217 to be reacted by the floats 252 to account for delay in thrusters 260 yaw corrections due to sudden wind direction changes.

Mass reductions achieved by removing the yaw system 121 and reducing the mast mass 120 have a compounding advantage on reducing overall mass in the YBM platform 200, composed of i) direct weight reduction by eliminating the yaw system and reducing mast weight, ii) secondary mass reduction by removal of ballast 140 and/or spar length otherwise required to counter-balance the tower-top yaw system and excess mass from the mast, and iii) tertiary reduction in floatation vessel volume/mass 130 needed to buoy up the yaw system and excess tower masses and their associated ballasts.

The YBM platform 200 design enables additional mass reductions in the spar buoy 235 by exchanging ballast-buoyancy gravitational righting capability with downwind horizontal outrigger leg(s) 250 and floats 252 to react rotor-induced thrust loads. Outrigger legs 250 positioned at or near the waterline, extend radially outward from a connection at the mast 220 and/or spar buoy 235 to the floats 252 at the outer end of the outrigger leg(s), whose buoyancy provides reaction force. Utilizing the outrigger 250 and floats 252 to react downwind rotor thrust 217 reduces the need for gravitational righting forces inherent in the ballast 240 being located below the center of buoyancy 230 and allows for both ballast mass and buoyancy volume/mass to be reduced.

Figure 3:
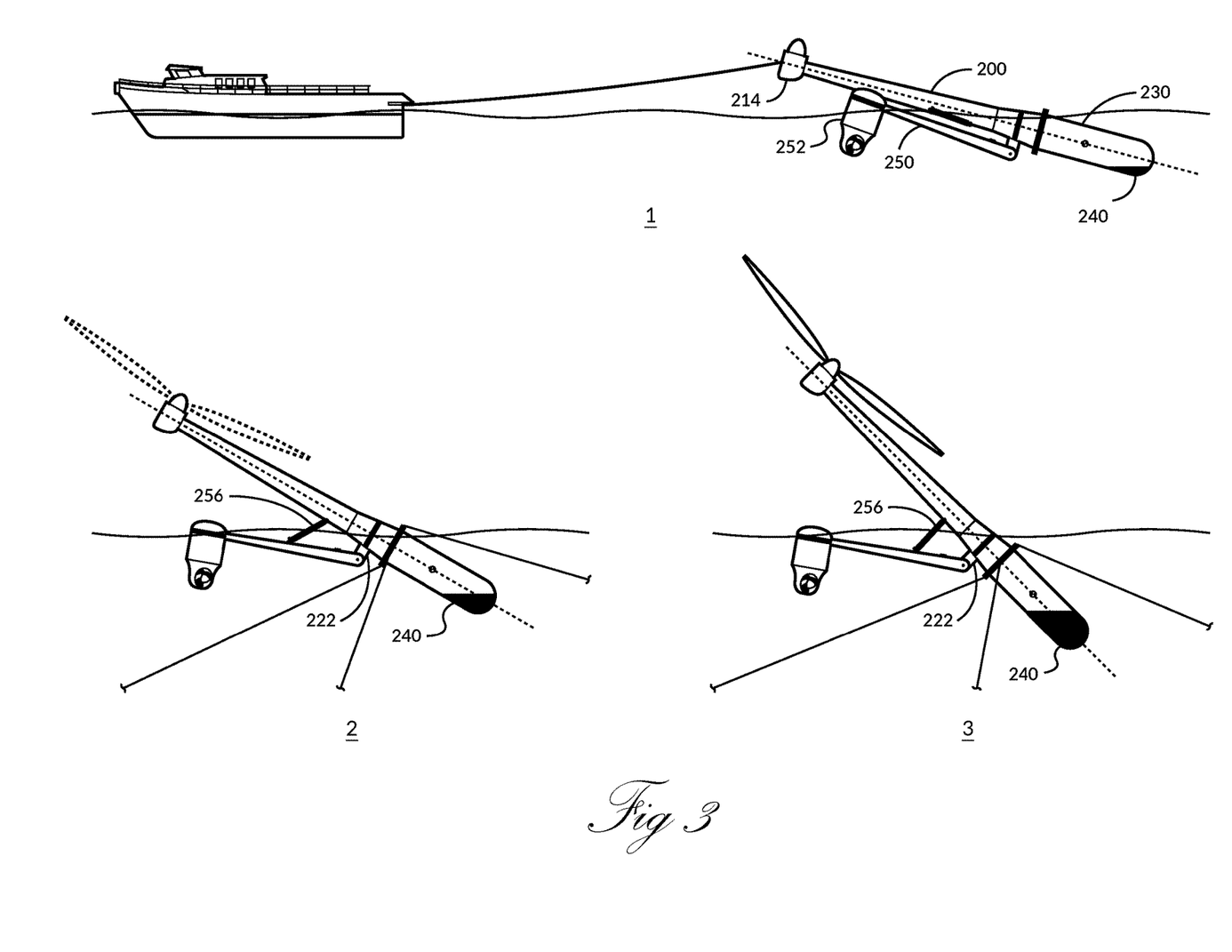
FIG. 3 illustrates the yawing buoy mast structure of FIG. 2a in various folded states and towed to a deployment site.

Referring to FIG. 3, to reduce deployment costs, the configuration of the YBM platform 200 is conducive to an efficient towing method to its installation site. The YBM platform 200 is designed to be floated in a nearly assembled state (shown at top) with the nacelle 214 mounted, but without the rotor blades 212 installed. The rotor blades 212 are installed once the YBM platform 200 is moored in position at the installation site (shown at bottom) and may be installed with the YBM platform in a semi-horizontal position, or once the YBM platform has been righted to a vertical position.

The outrigger legs 250 are connected to the mast 220 and/or spar buoy 235 by a hinge 222 positioned to allow the thruster legs 250 to be folded up to a near-parallel position with the mast 220 for deployment by towing to the installation site. In this position, the floats 252 at the end of the thruster legs 250 provide added buoyancy to the top end of the spar-mast structure 200 to keep the nacelle 214 above the water surface for protection from water entry to the nacelle and drivetrain. Ballasting 240 or adding buoyancy as needed to the spar-mast, adjusts the angle of the towed structure. The spar-mast structure is made to rotate from a near horizontal inclination for towing, to the vertical operating position by adding ballast 240 to the spar, such that the bottom end of the spar sinks, causing the YBM platform 200 to pivot to a vertical position while the outrigger legs swing to a horizonal position.

A longitudinal actuator 256, such as a hydraulic cylinder, attached on one end to a hinge point on the outrigger leg 250 and the other end to hinge point on the mast 220 or spar buoy 235 provides force and positioning capability to the outrigger leg 250. The actuator 256 pivots the outrigger leg 250 relative to the mast 220 causing the mast 220 and spar buoy 235 to tilt. The actuator 256 actively controls the outrigger leg 250 angle and reaction force based on commands from a controller. The actuator 256 also provides dynamic response capability to manage wind and wave forces on the YBM platform 200 through controller commands derived from sensor signals.

The YBM mast 220 supports less weight and is exposed to a narrower range of lateral loads than a conventional spar buoy FOWT mast 120, which must react rotor thrust loads 117 over a wind direction azimuth range 116 of 360 degrees. As the rotor thrust loading of the YBM mast 220 is in one primary direction, the mast cross section may deviate from an axis-symmetrical configuration to one that is bilaterally symmetrical with load reaction strength concentrated along the dividing plane, allowing the YBM mast 220 to be oval, tubular with reinforcement in one plane, bilateral truss, or a mast structure with forestays, each of these configured to optimize for narrow range of structural loading.

In one embodiment, the outrigger legs 250 may be positively buoyant and floats 252 are connected at the end of the legs 250 opposite the mast 220 connection. The buoyancy of floats 252 at the outer end of the leg(s) 250 and buoyancy of outrigger legs 250 both resists the YBM platform 200 overturning by the wind thrust loading 217 on the WTG 210. In another embodiment, the outrigger legs are raised above the water surface and are not intended to float so that all reaction force buoyancy is concentrated in the floats 252. In this case, the outrigger legs 250 may be of tubular design, lightweight open truss design, beam design or other structural configuration that provides the necessary structural strength and stiffness to effectively support the reaction forces induced on the floats 252.

Near the water line, encircling the spar buoy 235, below the outrigger legs 250 connection points, is a wet-bearing slip collar 270 with mooring lines 272 from the slip collar 270 to seabed anchors (not shown). This allows the YBM platform 200 to freely yaw, while restricting lateral motion within the ocean environment and acting as the pivot point of the spar buoy 200 in reacting wind loads on the turbine. Yawing the YBM platform 200 on its vertical axis requires thruster 260 propulsion applied tangentially to the horizontal radius of rotation in response to yaw commands from a controller. Yawing of the YBM platform 200 has minimal friction as velocities at the spar buoy 235 hull surface are low and bearing thrust loads are minimal as buoyancy effectively serves as a water bearing. Offshore winds tend to have less directional variability than typical onshore wind regimes, therefore thruster 260 cycling is not expected to be excessive to maintain upwind positioning during normal operation.

Figure 4:
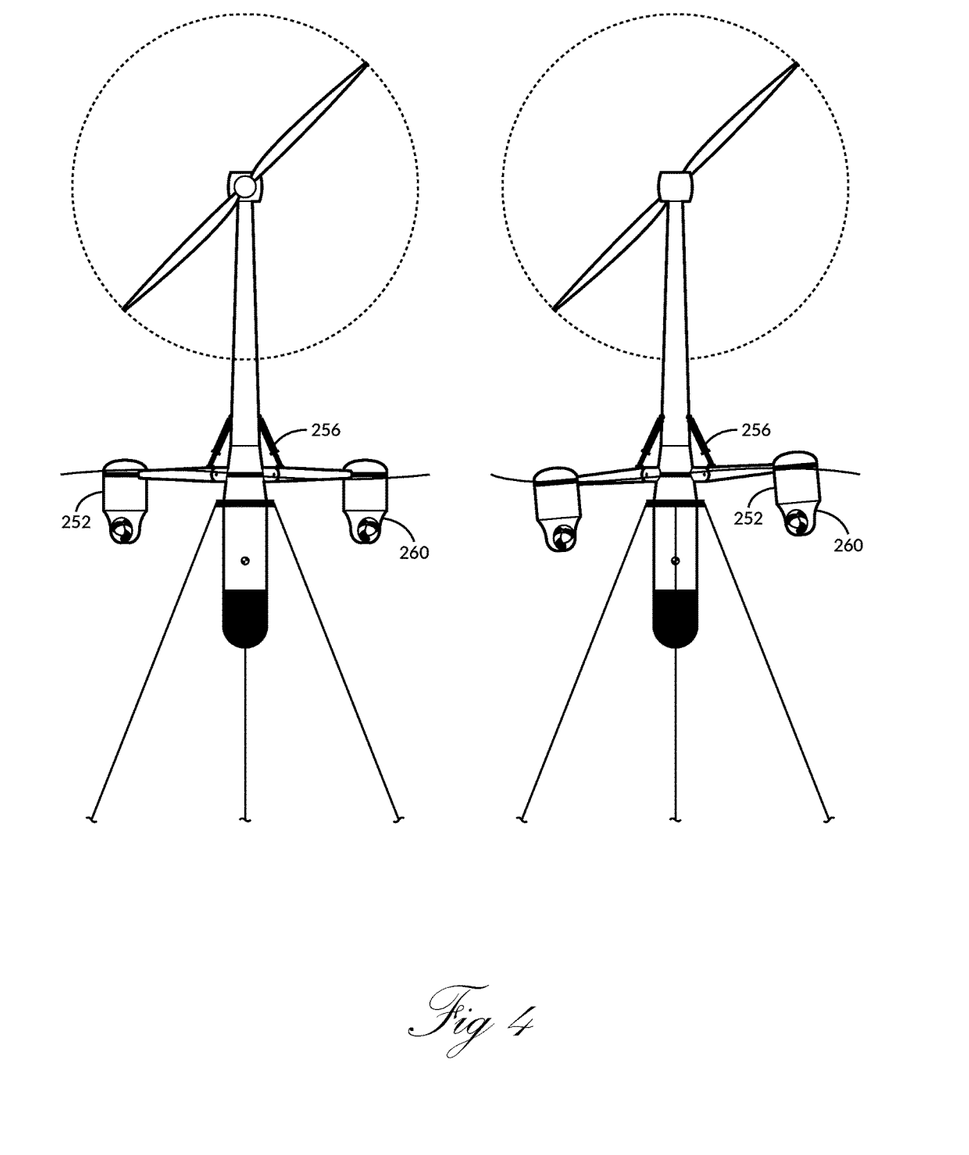
FIG. 4 illustrates the yawing buoy mast structure of FIG. 2b in two different wave states.

Referring to FIG. 4, the YBM platform 200 is subject to pitch, heave, roll and surge from wave action in varying sea states. In addition, currents acting on the spar buoy 235 and wind loading on the WTG 210 and mast 220 also act on the YBM platform 200. In one embodiment, each outrigger leg angle and reaction force may be adjusted independently of the other leg(s) 250 responding to the sea state from differing wave-heave and other forces imposed on each leg 250 to minimize structural loads and motion of the WTG 210, the mast 220, and spar buoy 235.

In another embodiment, a single outrigger leg 250 projects downwind of the primary rotor thrust direction 217 with two floats 252 mounted at either end of a pivoting arm attached to the distal end of the outrigger leg 250 perpendicular to the leg.

Figure 5:
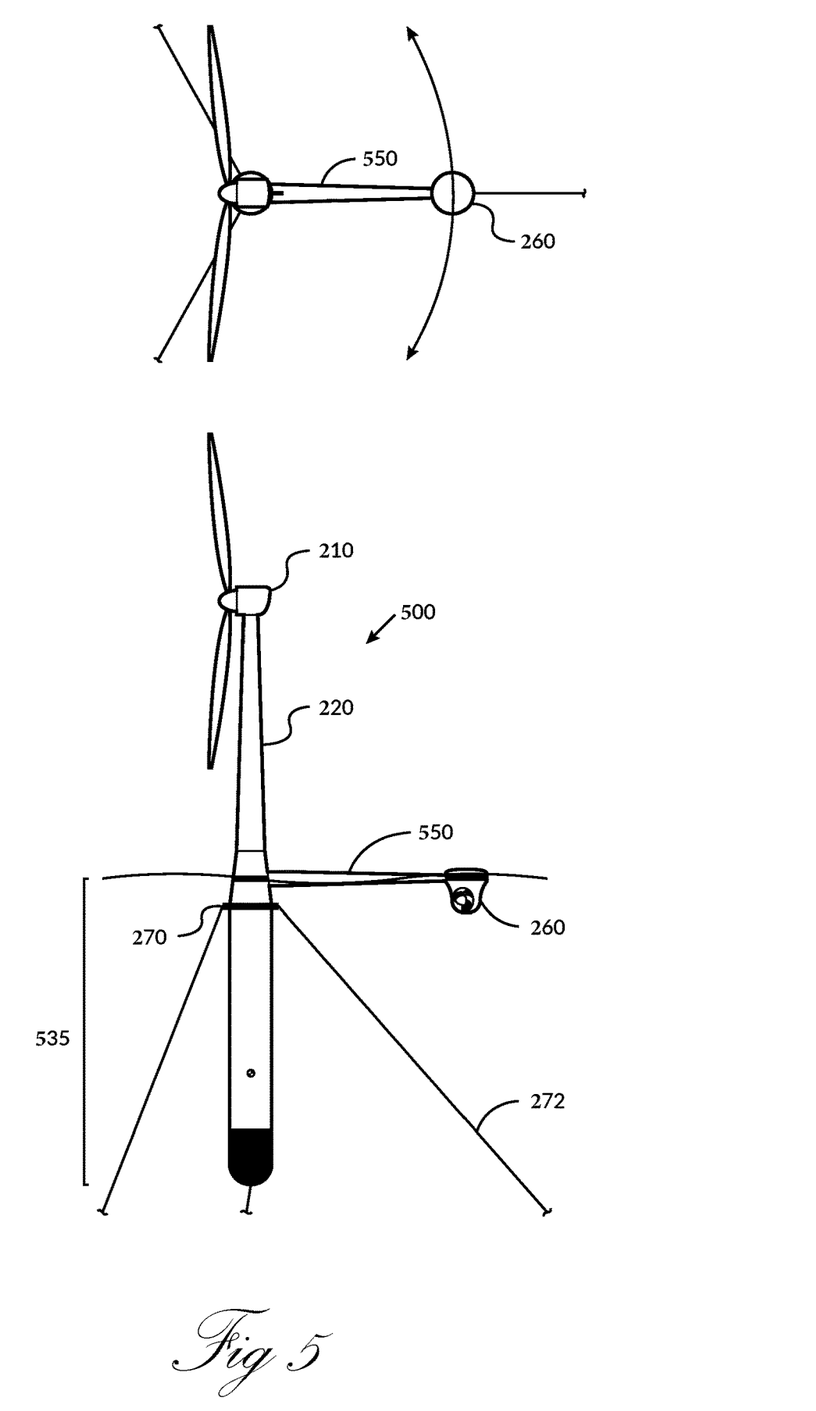
FIG. 5 illustrates top and side views of a yawing spar buoy mast structure according to another embodiment of the invention.
Figure 6:
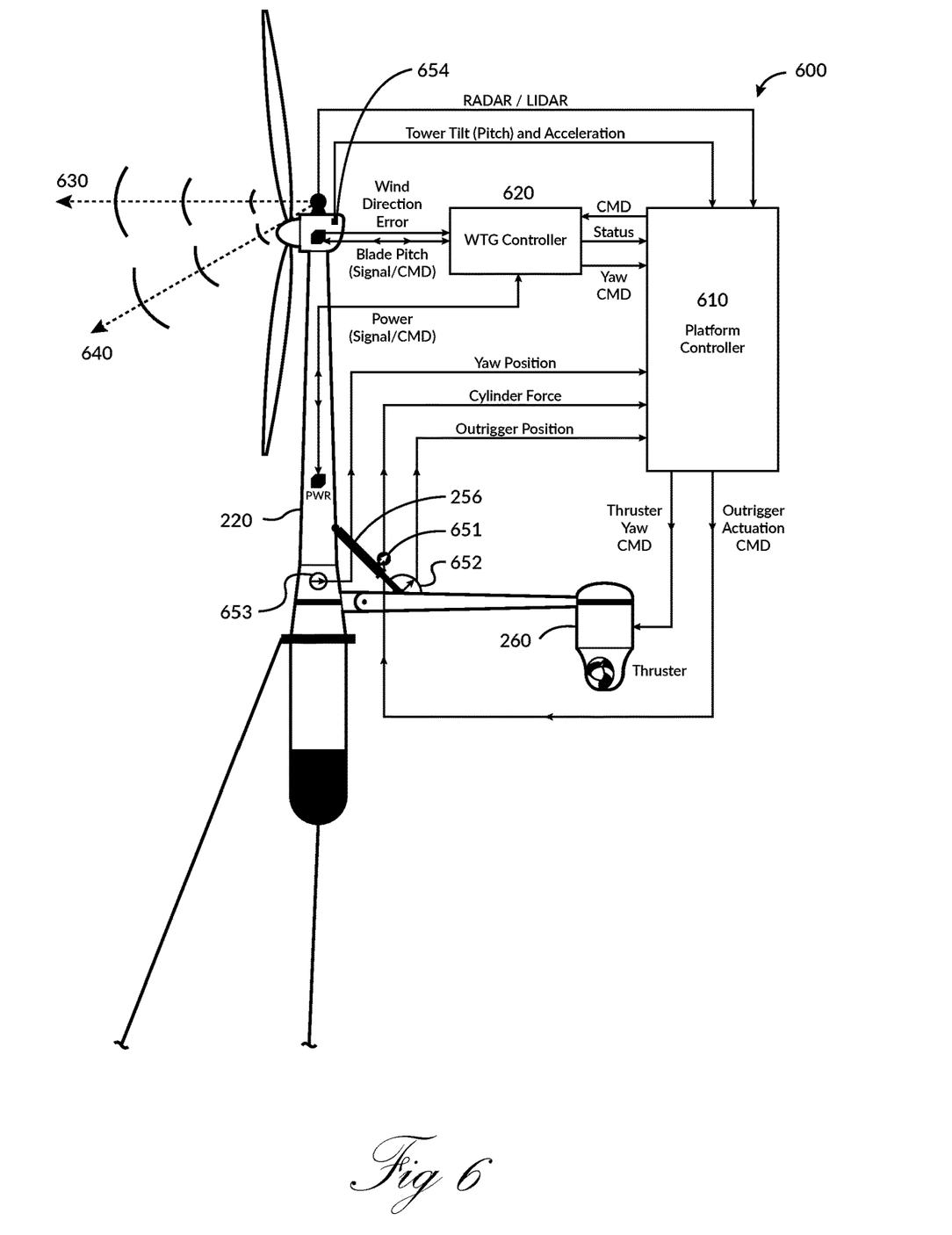
FIG. 6 illustrates controllers in a yawing buoy mast structure according to an embodiment of the invention.

Referring to FIG. 5, in another embodiment, a spar buoy platform FOWT 500 comprises a WTG 210, a mast 220, a spar buoy 535, a slip collar 270, mooring lines 272 and one or more fixed boom outriggers 550, preferably one as shown, coupled to the spar buoy 535 and mast 220 extending radially outward from the spar buoy 535 with a marine thruster 260 mounted to the distal end below the water line. Yawing the spar buoy platform FOWT 500 on its vertical axis may be achieved using thruster 260 with its propulsion applied tangentially to the horizontal radius of rotation in response to yaw commands from a controller. The horizontal translation of the spar buoy 535 is restricted by the slip collar 270 and mooring lines 272, which only allow rotational movement. In another embodiment of the invention, one or more fixed boom outriggers 550 are included in the spar buoy platform FOWT 200.

ments and RADAR for wave surface profiles and velocities readings. On the basis of the LiDAR 630 and RADAR 640 signals, as well tower tilt (pitch) and other status signals into the platform controller 610, CMDs may be issued to the outrigger actuators 256, thrusters 260 and WTG controller 620 to respond in a timely fashion to impending wind and wave conditions.

The WTG controller 620 and platform controller 610 operate in different modes depending on the environmental conditions surrounding the YBM platform 200; the corresponding command states and output power level from the WTG 210 are described as follows:

| Control Mode | Thruster Yaw CMD | Outrigger Actuator CMD | Blade Pitch CMD | WTG Power Output |
|---|---|---|---|---|
| Calm Wind: low Seas: low | Active: yaw YBM platform into expected wind direction | Inactive: tower vertical | Inactive: blades feathered | Zero power |
| Wind On Wind: medium Seas: low-medium | Active: yaw to maintain zero wind direction error | Active: maintain tower vertical, minimum tower top motion | Active: blades in full power position | Zero to full power |
| Wind On Storm Wind: high Seas: medium-high | Active: yaw to maintain zero wind direction error | Active: maintain tower vertical, minimum tower top motion | Active: override to shed wind load for platform stability | Full power |
| Wind Off, Storm Wind: extreme Seas: extreme | Active: yaw to maintain least impact wind/wave direction | Active: seek minimum tower-top motion | Inactive: blades feathered to shed wind | Zero power |

FIG. 6 illustrates a control system 600 according to an embodiment of the invention. The control system 600 is designed to reduce structural mass by means of an integrated system including the outrigger 250, actuator 256 and floats 252 all commanded by the platform controller 610, as well as WTG blade pitch and WTG generator torque commanded by the WTG controller 620. The two controllers act to minimize motion of the WTG 210 and avoid excess loading of the YBM platform 200 structure, as well as to maximize wind power production. The WTG controller 620, the identification and implementation of which are apparent to one of ordinary skill in the art, serves to manage the operations of the WTG including blade pitching and generator torque control. The platform controller 610 acts as a master controller which controls the outrigger actuators 256 and the yaw thrusters 260, as well as to provide override commands to the WTG controller 620 when needed to maintain the safety and stability of the YBM platform 200. Sensors indicating yaw position of the YBM platform 200, cylinder force of the outrigger actuator 256, angular position of the outrigger legs 250, and tower tilt angle and acceleration provide closed loop feedback signals to the platform controller 610. The WTG controller 620 sends a yaw command to the platform controller 610 to request a wind error correction to drive the azimuth error 201 to zero. The platform controller 610 sends a corresponding signal to the thrusters 260 to yaw the YBM platform 200 in a manner to reduce the azimuth error 201 to zero.

Monitoring wind and wave conditions ahead of their impacts on the YBM platform 200 adds predictive control data to the WTG controller 620 and platform controller 610, which is provided using LiDAR for wind velocity measure- The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A floating offshore wind turbine comprising:
   a spar buoy;
   a wind turbine and mast affixed to the spar buoy;
   a first outrigger leg coupled to the spar buoy via a first hinge;
   a second outrigger leg coupled to the spar buoy via a second hinge;
   a first float attached to the first outrigger leg;
   a second float attached to the second outrigger leg; and
   a first marine thruster coupled to the first outrigger leg via the first float.

2. The floating offshore wind turbine of claim 1, further comprising a second marine thruster, wherein the second marine thruster is coupled to the second outrigger leg via the second float.

3. The floating offshore wind turbine of claim 1, wherein the first hinge permits a distal end of the first outrigger leg to move relative to a central axis of the spar buoy.

4. The floating offshore wind turbine of claim 3, further comprising a first actuator affixed between the first outrigger leg and the spar buoy, and the first actuator configured to move the distal end of the first outrigger leg relative to the central axis of the spar buoy.

5. The floating offshore wind turbine of claim 4, wherein the second hinge permits a distal end of the second outrigger leg to move relative to the central axis of the spar buoy, and further comprising a second actuator affixed between the second outrigger leg, and the second actuator configured to move the distal end of the second outrigger leg relative to the central axis of the spar buoy.

6. The floating offshore wind turbine of claim 1, wherein the first marine thruster is configured to yaw the spar buoy.

7. The floating offshore wind turbine of claim 2, wherein the second marine thruster is configured to yaw the spar buoy.

8. The floating offshore wind turbine of claim 1, further comprising a wet bearing slip-collar encircling the spar buoy.

9. A floating offshore wind turbine comprising:
   a spar buoy;
   a wind turbine and mast affixed to the spar buoy;
   an outrigger leg or fixed boom coupled to the spar buoy;
   a float coupled to the outrigger leg or the fixed boom; and
   a thruster coupled to the float to yaw the spar buoy.

10. The floating offshore wind turbine of claim 9, further comprising means for folding or unfolding the float relative to the spar buoy.

11. A method of deploying a floating offshore wind turbine, the method comprising the steps of:
   towing a floating offshore wind turbine comprising a spar buoy mast, a wind turbine affixed to the spar buoy mast, a first outrigger leg coupled to the spar buoy via a first hinge, and a second outrigger leg coupled to the spar buoy via a second hinge, wherein the first outrigger leg and the second outrigger leg are arranged in a folded position;
   unfolding the first outrigger leg and second outrigger leg away from the folded position to an unfolded position via the first hinge and the second hinge; and
   mooring the floating offshore wind turbine to a seabed.

12. The method of claim 11, further comprising the step of installing wind turbine blades onto the wind turbine while the first outrigger leg and the second outrigger leg are arranged in the folded position.

13. The method of claim 11, further comprising the step of yawing the spar buoy mast to arrange the wind turbine facing wind.

14. A floating offshore wind turbine control system for a floating offshore wind turbine comprising a turbine, a platform, an outrigger leg, and actuator, a spar buoy, a thruster, and a mast, the system comprising:
   a platform controller;
   a sensor measuring angular position of a first outrigger leg;
   a sensor measuring force in the first actuator;
   a sensor measuring azimuth angular position of the spar buoy; and
   a sensor measuring tilt angle of the mast.

15. The control system of claim 14, wherein the sensor measuring angular position of the first outrigger leg and the sensor measuring force in the first actuator send a signal to the platform controller, triggering the platform controller to issue a command to the first actuator to change position of a distal end of the first outrigger leg or to change force in the first actuator.

16. The controller system of claim 14, wherein the sensor measuring azimuth angular position of the spar buoy sends a signal to the platform controller, triggering the platform controller to issue a command to the thruster to yaw the spar buoy.

17. The controller system of claim 14, wherein the sensor measuring tilt angle of the mast sends a signal to the platform controller, triggering the platform controller to issue a command to the actuator to move the outrigger.

18. The method of claim 11, the floating offshore wind turbine further comprising a ballast section, and further comprising the step of adding ballast to the ballast section to pivot the spar buoy mast from a horizontal position to a vertical position.

* * * * *